(12) United States Patent
Prowell et al.

(10) Patent No.: US 10,685,118 B2
(45) Date of Patent: Jun. 16, 2020

(54) SYSTEM AND METHOD FOR MONITORING POWER CONSUMPTION TO DETECT MALWARE

(71) Applicant: UT Battelle, LLC, Oak Ridge, TN (US)

(72) Inventors: Stacy J. Prowell, Oak Ridge, TN (US); Jeffrey A. Nichols, Oak Ridge, TN (US); Jarilyn M. Hernandez Jimenez, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 168 days.

(21) Appl. No.: 15/980,045

(22) Filed: May 15, 2018

(65) Prior Publication Data

US 2018/0330091 A1 Nov. 15, 2018

Related U.S. Application Data

(60) Provisional application No. 62/506,114, filed on May 15, 2017, provisional application No. 62/506,131, filed on May 15, 2017, provisional application No. 62/506,170, filed on May 15, 2017.

(51) Int. Cl.
| | |
|---|---|
| *G06F 11/00* | (2006.01) |
| *G06F 21/56* | (2013.01) |
| *G06F 1/28* | (2006.01) |
| *G06F 21/55* | (2013.01) |

(52) U.S. Cl.
CPC .............. *G06F 21/567* (2013.01); *G06F 1/28* (2013.01); *G06F 21/552* (2013.01); *G06F 21/554* (2013.01); *G06F 21/566* (2013.01)

(58) Field of Classification Search
USPC .................. 726/22, 23–25; 713/187–189
See application file for complete search history.

(56) References Cited

U.S. PATENT DOCUMENTS

| | | | | |
|---|---|---|---|---|
| 7,877,621 | B2* | 1/2011 | Jacoby | G06F 21/55 |
| | | | | 713/300 |
| 8,332,945 | B2* | 12/2012 | Kim | G06F 1/28 |
| | | | | 726/24 |
| 8,341,758 | B2 | 12/2012 | Kim et al. | |
| 8,453,261 | B2 | 5/2013 | Morin et al. | |
| 9,262,632 | B2* | 2/2016 | Reed | G06F 11/3062 |

(Continued)

FOREIGN PATENT DOCUMENTS

CN 102592068 A 7/2012

*Primary Examiner* — Amare F Tabor
(74) *Attorney, Agent, or Firm* — Benesch, Friedlander, Coplam & Aronoff LLP

(57) ABSTRACT

A system and method (referred to as the system) detects malware, viruses, and/or malicious activity by generating a direct current source power consumption profile by causing a monitored device to execute a fully automated recurrent software operation. The system receives by an automated detection system, the direct current source power consumption profile generated by an intelligent power sensor and generates by a detection engine, a power security profile that identifies suspicious code by profiling direct current consumed by monitored type devices. The system executes a detection engine remote from the monitored device that identifies an infected device.

28 Claims, 6 Drawing Sheets
(2 of 6 Drawing Sheet(s) Filed in Color)

(56) References Cited

U.S. PATENT DOCUMENTS

| | | | |
|---|---|---|---|
| 9,633,546 B2* | 4/2017 | Felch | G08B 21/245 |
| 9,654,978 B2* | 5/2017 | Lundblade | H04W 12/08 |
| 9,785,213 B2* | 10/2017 | Dent | G06F 1/266 |
| 10,278,074 B1* | 4/2019 | Shen | H04W 12/1208 |
| 10,296,660 B2* | 5/2019 | Kung | G06F 16/90339 |
| 2007/0128899 A1* | 6/2007 | Mayer | G06F 9/4406 |
| | | | 439/152 |
| 2013/0179973 A1* | 7/2013 | Du | G06F 21/81 |
| | | | 726/24 |
| 2016/0048682 A1 | 2/2016 | Gou et al. | |

* cited by examiner

| 12V CPU results | | Registry Task | | | | | Internet Explorer Task | | | | | |
|---|---|---|---|---|---|---|---|---|---|---|---|---|
| | Run | Kurtosis | Permutation Entropy | Ds data distance | Ds shape distance | L2 error | Kurtosis p values | Permutation Entropy | Ds data distance | Ds shape distance | L2 error | Number Over Threshold |
| Threshold | | 0.713 | 0.077 | 0.448 | 0.153 | 23.162 | 0.840 | 0.024 | 0.388 | 0.0825 | 50.189 | 4 |
| Not Infected | 1 | 0.571 | 0.082 | 0.539 | 0.136 | 22.967 | 0.002 | 0.008 | 0.407 | 0.068 | 49.151 | 3 |
| | 2 | 0.648 | 0.063 | 0.441 | 0.143 | 23.698 | 0.082 | 0.013 | 0.404 | 0.058 | 47.865 | 2 |
| | 3 | 0.771 | 0.054 | N/A | 0.149 | 23.133 | 0.021 | 0.004 | 0.365 | 0.105 | 46.887 | 2 |
| | 4 | 0.746 | 0.014 | N/A | 0.190 | 22.882 | 0.080 | 0.020 | 0.373 | 0.037 | 41.626 | 2 |
| | 5 | 0.056 | 0.059 | 0.434 | 0.091 | 24.597 | 0.135 | 0.020 | 0.393 | 0.089 | 44.394 | 3 |
| Alureon | 1 | 0.876 | 0.042 | 0.409 | 0.146 | 25.823 | 6.925 | 0.019 | 0.443 | 0.124 | 63.161 | 6 |
| | 2 | 0.909 | 0.020 | 0.633 | 0.309 | 26.812 | 14.577 | 0.005 | 0.456 | 0.108 | 61.509 | 8 |
| | 3 | 0.597 | 0.031 | 0.402 | 0.151 | 24.407 | 0.917 | 0.026 | 0.413 | 0.049 | 63.822 | 5 |
| MaxRootkit | 1 | 1.007 | 0.056 | 0.621 | 0.372 | 26.351 | 2.613 | 0.004 | 0.484 | 0.094 | 53.034 | 8 |
| | 2 | 0.952 | 0.064 | N/A | 0.388 | 27.128 | 1.527 | 0.017 | 0.452 | 0.104 | 59.136 | 7 |
| | 3 | 0.968 | 0.063 | 0.475 | 0.320 | 26.491 | 1.944 | 0.031 | 0.494 | 0.059 | 53.721 | 8 |
| Pihar | 1 | 0.578 | 0.081 | N/A | 0.110 | 25.021 | 0.572 | 0.027 | 0.416 | 0.079 | 64.054 | 5 |
| | 2 | 0.941 | 0.070 | 0.539 | 0.292 | 27.676 | 0.808 | 0.080 | 0.413 | 0.073 | 55.365 | 7 |
| | 3 | 0.857 | 0.049 | 0.621 | 0.090 | 25.918 | 0.158 | 0.010 | 0.449 | 0.102 | 58.202 | 6 |
| Sirefef | 1 | 0.769 | 0.037 | 0.403 | 0.131 | 24.963 | 0.160 | 0.009 | 0.424 | 0.092 | 58.919 | 5 |
| | 2 | 0.861 | 0.052 | 0.633 | 0.367 | 27.077 | 2.924 | 0.001 | 0.467 | 0.059 | 58.849 | 7 |
| | 3 | 0.953 | 0.042 | 0.633 | 0.351 | 26.622 | 1.463 | 0.013 | 0.478 | 0.069 | 50.949 | 7 |
| Xpaj | 1 | 0.913 | 0.065 | 0.445 | 0.282 | 26.970 | 0.272 | 0.008 | 0.428 | 0.067 | 52.595 | 5 |
| | 2 | 0.911 | 0.031 | 0.434 | 0.274 | 27.441 | 0.739 | 0.006 | 0.396 | 0.053 | 50.917 | 5 |
| | 3 | 0.995 | 0.040 | N/A | 0.299 | 25.857 | 0.651 | 0.025 | 0.466 | 0.047 | 55.907 | 6 |
| True Positive | | 0.87 | 0.07 | 0.47 | 0.67 | 1.00 | 0.53 | 0.33 | 1.00 | 0.40 | 1.00 | 1.00 |
| False Positive | | 0.40 | 0.20 | 0.20 | 0.20 | 0.40 | 0.00 | 0.00 | 0.60 | 0.40 | 0.00 | 0.00 |

FIGURE 4

SYSTEM AND METHOD FOR MONITORING POWER CONSUMPTION TO DETECT MALWARE

PRIORITY CLAIM

This application claims priority to U.S. Provisional Patent Application No. 62/506,114, titled "System and Method for Monitoring Power Consumption to Detect Malware"; U.S. Provisional Patent Application No. "62/506,131, titled "System and Method for Monitoring Power Consumption to Detect Malware," and 62/506,170, titled "Tampering Detection Heartbeat," each of which were filed on May 15, 2017, and each of which are herein incorporated by reference.

STATEMENT REGARDING FEDERALLY SPONSORED RESEARCH AND DEVELOPMENT

These inventions were made with United States government support under Contract No. DE-AC05-00OR22725 awarded by the United States Department of Energy. The United States government has certain rights in the inventions.

BACKGROUND

Technical Field

This disclosure relates to detecting intrusive programs and more specifically to intrusive software that infects software and cause malicious operations.

Related Art

Traditional virus detection generally looks for known viruses. Known viruses are identified through code matching processes that compare suspect code to code that is indicative of known threats. Unfortunately, traditional virus detection does not catch never-before-seen threats.

Dynamic virus detection executes suspect code in an isolated, monitored, and controlled environment known as a sandbox. Execution is monitored to detect undesired activity including undesired connections to ports, connections to malicious hosts, and executions that are indicative of a known threat. Dynamic virus detection often fails to detect viruses because of "delay code," "logic bombs," and "anti-sandboxing" strategies. Delay code delays the execution of a virus so it is not run when software is sandboxed. Logic bombs wait for a particular set of circumstances to occur before starting execution of a virus. Anti-sandboxing strategies delay the execution of a virus when code is running in a sandbox.

While dynamic detection has the potential to detect never-before-seen threats, the process consumes time and resources of the targeted machine and exposes the targeted machine to the intrusive and damaging effects of a virus.

DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 shows an analysis and detection using the central processing power rail.

DETAILED DESCRIPTION

Figure 1:
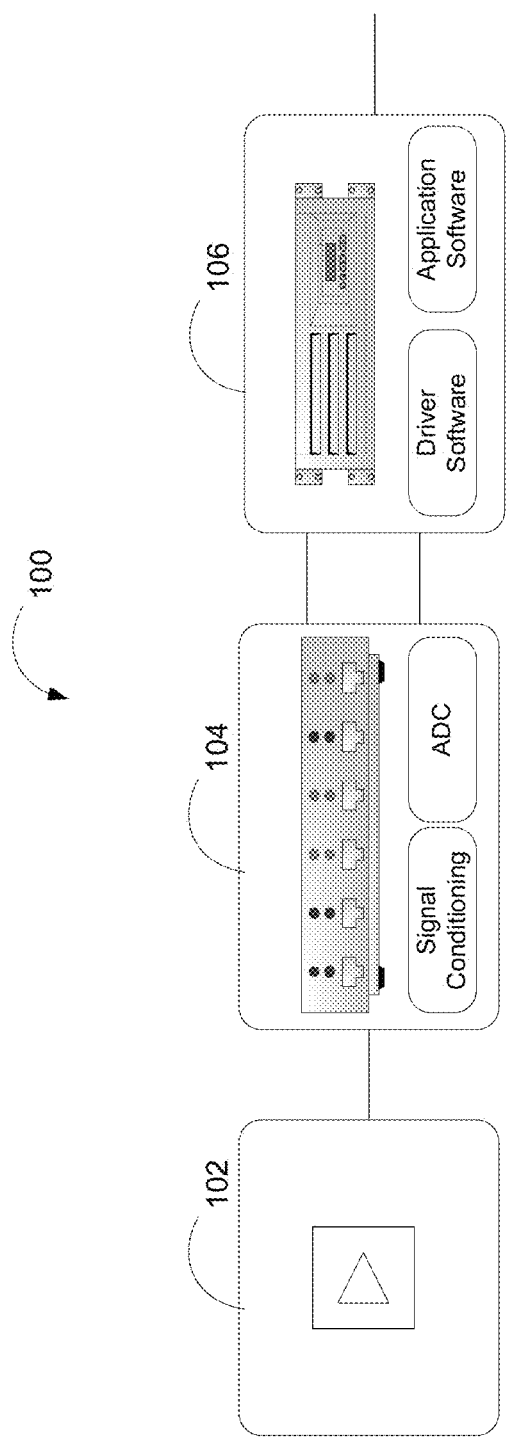
FIG. 1 is a block diagram of an intelligent power sensor.

An automated detection system and process (referred to as ADS) detects software (malware and/or viruses) intended to damage or disable a network and/or an electronic device. Automated detection occurs upon an event such as when a program launches or on a schedule (e.g., at specific times and/or days). The system's near real-time analysis (e.g., updating information as the same rate it is received) provides continuous feedback and pinpoints identifications that establish when and where infections occurred. The system provides fewer false positive detections than known systems and is capable of identifying temporal trends, using, in part, descriptive statistics and probabilities. Some systems are resilient. The systems facilitate the return of targeted networks and/or devices to safe operating states when a detection is confirmed.

Some ADS monitor multiple voltage rails that source a network or an electronic device. Rails refer to multiple conductors that carry specific voltage levels that are often connected to a single tap of a power supply or transformer. The ADS monitors direct current power and identifies malware and/or viruses through one or more anomaly detections. In contrast to traditional detection that simply looks for infections based on code comparisons or attempts to detect malicious activity in isolation (i.e., sandboxes), the disclosed power-based scans can detect infections in resident code and/or downloadable code without accessing or touching the virus, the malware, or the targeted software application or infected code. The ADS detects anomalous behavior such as when the software is performing a potentially dangerous or unwanted operation—e.g., renaming or deleting files or copying itself.

Because power-profiles generated by the ADS may communicate granular information about potentially suspicious code generated by ADS power-based scans, the power-profiles protect against previously unknown viruses as well as "obfuscated code"—known viruses that have been cosmetically modified to avoid detection by code-matching detections. Because ADS uses out-of-band collection and processing (e.g., collection and processing on a separate or remote machine), some ADS do not rely on the potentially infected devices for detection, and therefore, the ADS is resistant to undesired modifications by them. Further, malware or viruses cannot disable some ADS, and some systems do not consume any resources (e.g., processing or memory resources) from the potentially infected devices. An ADS does not require additional software installations on a potentially infected device, avoiding the vulnerabilities inherent to known virus detection software, which consumes significant amounts of memory and processing resources of those devices, requires high processing privileges, and often requires regular software updates.

The power-profile approach enables a more flexible and nuanced virus detection. After the ADS generates a clean operating power security profile, the ADS can pinpoint and communicate when and where an infection occurred, which allows the infected device to determine whether to shut down the infected code, the hosting application, or even the infected device by reviewing a security policy that is associated with the infected device or the user. Different security policies may be tailored to different users, types of users, devices, and/or types of devices. Further, access to the security profile including information about particular known and unknown potential threats enables information technology administrators to construct security policies with highly granular rules for one or more machines and allows the administrator to alter those security policies in response to evolving threats. Devices may include computers, smart appliances, interne connected devices, vehicles, and supervisory control and data acquisition (SCADA) systems, for example. The detection of known and unknown threats without burdening a targeted or infected device makes the ADS not abstract and substantially more.

An intelligent power sensor measures the electrical characteristics of the devices by simultaneously measuring voltage and/or a current. Four common rails used in a device are the three and three tenth-volt rail, the five-volt rail, and two twelve-volt rails. In a computer, for example, the three and three tenth-volt rail sources chipsets and ports such as the dual in-line memory modules, accelerated graphics port, peripheral component interconnect ports, etc. The five-volt rail drives the disk drive logic, low voltage motors, single in-line memory modules, other peripheral component interconnect ports, other accelerated graphics port, various buses such as the Industry Standard Architecture, etc., for example, of a computer. A twelve-volt rail may drive a computer's motors, its high voltage regulators, other accelerated graphics ports, peripheral component interconnect ports, etc. A second twelve-volt rail may drive the central processing unit.

FIG. 1 shows an intelligent power sensor 100 (also referred to as an intelligent sensor) that includes transducers 102 that measure analog signals and signal conditioning devices 104 that convert the electrical measurement signals into a form that may be converted into digital values. The intelligent power sensor 100 also includes an analog-to-digital converter 104 that converts the conditioned signals into digital values and a microprocessor or controller 106 that manages the data acquisition. The intelligent power sensor 100 may be standalone or remote from any of the monitored devices, may be integrated with any of the monitored devices, or may be a unitary part of one or more monitored devices and any of the one or more devices or systems described in this written description or shown in FIG. 2. With software commands, the intelligent power sensor 100 acquires analog samples from two or more channels such as the four rails described above. The analog data is continuously acquired through the transducers 102, conditioned by the signal conditioning devices 104, and converted into digital data through the analog-to-digital converters 104. The digital data is written to a buffer in a first-in-first-out sequence until a power-based scan is complete. A logging application may acquire the analog and digital data that is stored in dedicated or aggregated files for real-time analysis, comparisons, and/or non-real time reuse. Optionally, the intelligent smart sensor 100 may create subfolders in the files named after the monitored device type, voltage/current level and/or a serial number assigned to the monitored device in memory.

An analog or digital trigger or event may initiate and/or terminate a logging session of the monitored device. An event trigger may occur when the monitored device is powered up, each time a monitored device launches a software application, when a power signal sourcing the monitored device exceeds or falls below a defined threshold, and/or when conditions of a digital pattern of the monitored device (mis)matches a defined bit pattern or anomaly detection state. By employing a power consumption profile matching and/or mismatching (i.e., a direct current (mis)matching) and/or anomaly detection analysis the ADS employs a new kind of process that enables security systems to do things that known security systems could not do before. The power-profile approach allows security access to be tailored to different users and ensures that threats are identified before infections are known or quarantined without running additional software that often loads down a monitored device. The fact that the power-profile "identifies suspicious code" allows the system to accumulate and utilize newly available behavior-based power-profile information about potential threats that may be unknown to be used for further defenses. This improves electronic device functionality.

An exemplary ADS may generate power-based profiles by causing operations to be executed on the machine on a defined schedule like a fully automated recurrent operation or a heartbeat. A recurrent operation or heartbeat occurs at regular temporal or frequency intervals or repeatedly during the time in which a monitored device is actuated. Through the periodic execution of highly optimized operations such as periodic enumerating processes, periodic opening of files, and/or a periodic enumerating network ports, etc., the automated recurrent operations consume minimal power and processing time, and generate a power profile mark below a noise floor of the output of a direct current power source. A noise floor is the measure of the signals generated from a sum of all the noise sources (e.g., sources generating undesired signals) and unwanted signals identified by a measurement system (e.g., the intelligent power sensor 100) in the output of a direct current source driving the monitored device. Noise is generally any signal other than the desired signal. Because a power profile mark is unique to the recurrent operation or heartbeat and is detectable by the intelligent power sensor 100, any detection even one below the noise floor verifies its periodic execution. Further, if malware or viruses disable the recurrent operation (also known as the heartbeat), the malware or viruses will be detected because of a recurrent signal or a heartbeat's signal absence in the source signal to the monitored device. An infected heartbeat or recurrent operation is further detected because an infected device consumes detectably more power and time than a heartbeat or a recurrent operation executed on uninfected device. If the recurrent operation or heartbeat is operable and its voltage or current profile or power profile mark exceeds a detection threshold and/or varies in frequency, and/or time from a baseline, the virus or malware is detectable in real-time (e.g., as the virus or malware executes).

Because fully automated recurrent code or heartbeat code does not require modification of a device's kernel, it may be deployed in embedded devices and in devices where modification of the kernel software to accomplish a detection mission is untenable. Exemplary pseudocode, for an exemplary ADS may scan on a defined and/or periodic schedule perhaps once every ten seconds, for example. N is a preprogrammed time. Alternately, execution may be programmed to occur periodically, such as about every 0.1 Hz or may occur "waiting" for a defined period of time. F is a preprogrammed frequency.

--- do every N seconds or wait every N seconds or
for every F frequency{ get process table; for each

```
process { get process data;
}
get list of open ports; for each open port {
get port information;
}
... / Other operations, as they are identified
}
```

A process table scanned by a device registry is a data structure in random access memory of the monitored device such as computer. The process table holds the information about the processes that are currently handled by an operating system (OS). This information includes general information about each process such as the process' identification (e.g., what it is), the process owner (e.g., who it belongs to), the process' priority, the environment variables for each process, the parent process, and pointers to the executable machine code of a process (e.g., where is it stored). Information in a process table also includes the current state of each process.

A scan or enumeration of the process table of a monitored device reveals the list of running processes on the device (e.g., the computer) that may reveal the virus or malware. Malicious software desires to be left out from such process listing or appear as something known and benign in the listing to avoid detection. To achieve this objective, the malicious software modifies kernel routines that enumerate processes to prevent its own process from being revealed. Rootkits, for example, hide files, data, processes, and network ports, and can modify the operating system to survive system restart and even a "rollback" or recovery effort. Such known and other unknown malware and viruses induce a drag on the monitored device by executing many more steps to remain hidden (e.g., for example, executing thirty or forty more processing steps versus the two or three normally executed). These operations increase the power consumed by the monitored device. The automated recurrent operation or heartbeat pushes the processing level up high enough above the noise floor of the direct current source by executing, and in some instances, executing only a number of kernel application program interface calls (API calls) on the monitored device. The number and type of API calls make the power consumed by the malicious software detectable. The automated recurrent operation or heartbeat may then go to sleep. The API calls run the processor, memory, and/or bus of the monitored device hard enough to create a load that is detectable by the intelligent power sensor 100 that monitors the device's direct current voltage and/or current consumptions and/or temporal and frequency characteristics of the direct current voltage and/or current and/or power profile marks.

Anomaly detectors execute a statistical anomaly detection method, referred to as a behavior-based detection that cross-checks a monitored device's operating characteristics against many base-line factors that may be stored in one or more data sets on the separate or remote monitoring device or machine. In some ADS, two or more unsupervised anomaly detection techniques are used to set baseline factors in power-scan data applying the principle that the majority instances in the direct power data set represent a normal operating state. A semi-supervised anomaly detection technique may then be executed by constructing one or more models representing normal direct current power source consumption behavior from the baseline data set, and then testing the likelihood of an infection by comparing the power scan data sampled by the intelligent power sensor 100 to data generated by the learnt model(s).

Figure 2:
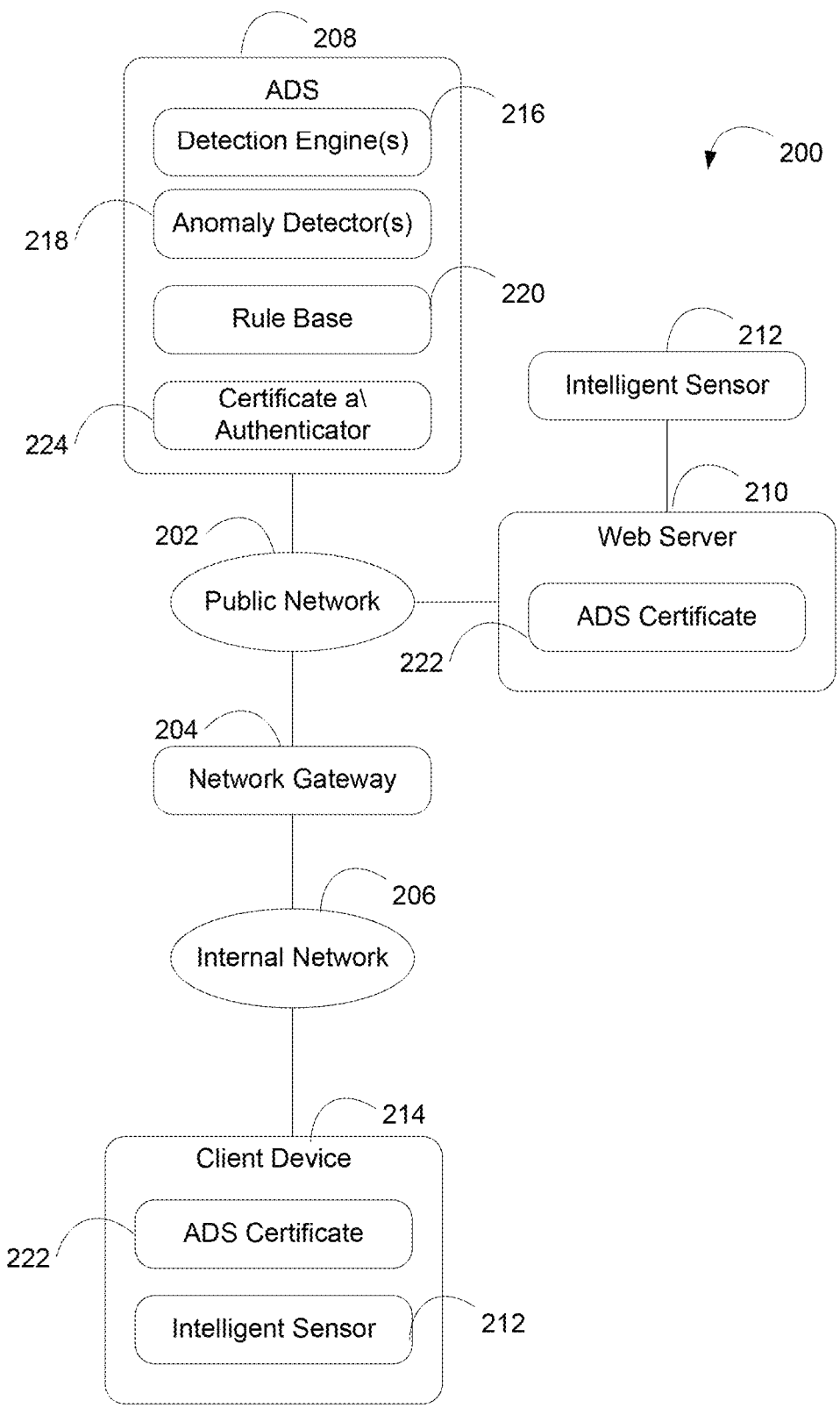
FIG. 2 is a block diagram of an automated detection system.

FIG. 2 is a block diagram of a site-to-site network 200. The site-to-site network 200 includes a public network 202, such as the Wide Area Network (WAN) or the Internet, coupled via a network gateway 204 to an internal network 206, such as a Local Area Network (LAN). The site-to-site network 200 further includes the ADS 208 coupled to the public network 202, a potentially infected Web server 210 coupled to an intelligent sensor 212 and also coupled to the public network 202, and a potentially infected client device 214 coupled to the internal network 206. Connections to public or internal networks 202 and 206 are merely exemplary, and alternative systems have other connections. Further, the intelligent sensor 212 is shown as remote and integral to the potentially infected Web server 210 and client 214, respectively. The intelligent sensor 212 may be a part of a single remote device or may comprise distributed components at multiple sites. A site is generally a computer or network of computers associated with a unique identifying number on a public network. Further, ADS 208, and web server 210, and client device are shown as distinct sites. These elements may be a part of an integral or unitary site, may each include components at multiple sites, or maybe at single sites or distributed among multiple sites.

The ADS 208 includes a detection engine 216 for examining the received power-based scans, e.g., a signed intelligent sensor file received from the Web server 210 or client 214, a power-scan security profile (PSP) generated by the anomaly detectors 218. A PSP preferably includes a model or statistical thresholds of uninfected base line direct current power-based operating profiles and/or all direct current power-based profiles generated by all potentially hostile or suspicious computer operations that may be attempted, and may also include the respective arguments for these operations. A PSP maybe generated by executing code and analyzing any direct current power-based patterns, receiving direct current power-based scans generated by the original equipment manufacturers (OEMs), or receiving direct current power-based scans known to reflect hostile code operation. The ADS detection engine 216 preferably pre-generates or pre-fetches all the power-based scans embodied in the PSP. Any of the base-line direct power-based scans may be selected by the detection engine 216 where selections may be based on the detection engine's 216 detection operation (e.g., matching a power-based scan associated with a malicious operation, mismatching a power-based scan associated with normal operation profiles, etc.). The detection engine 216 preferably performs a full-power scan inspection by processing the PSP, a rule base 220, and the received power scans. The rules base 220, which is retained in a database, may supplement the PSP by providing an updatable list of operations and power-based scans or statistical data associated with those scans deemed suspicious, known to be generated by hostile operations, generated by viruses or malware, etc.

In FIG. 2, the intelligent sensor 100 generates and attaches an upload-able identifier to the files generated by the intelligent sensor 100. The upload-able identifier may be stored as part of the generated power-based scans at the web server 210 or client device 214, since multiple scans may be attached to one upload-able file and each may have a different upload-able identification. In some systems, the web server 210 or client device 214 assigns a hash of the complete power-based scans as part of the identifier.

After the web server 210 and/or client device 214 executes one or more iterations of the recurrent operation or heartbeat, the web server 210 and/or client device 214 attaches an ADS certificate 222 to its upload-able files generated by the intelligent sensor 212. The upload-able files contain the power/power-based scans generated during the one or more iterations of the recurrent operation or heartbeat. The ADS certificate 222 establishes the authenticity of the power-based scan files that are part of the upload-able file. The web server 210 and/or client device 214 then transmits the signed upload-able file to the ADS engine 216 for inspection. When a direct current power-profile does not meet a baseline (e.g., because a recurrent voltage level is exceeded, a periodic power profile mark is missing, a periodic and/or scheduled power profile mark is offset in frequency, time, and/or in time or frequency, etc.,) a potentially infected device is identified. The ADS engine 216 may automatically communicate the identification to a network administrator, load balancer (not shown) and/or web server 210 and/or client device 214 and identify when and where the infection was detected. Remedial action may then be implemented, such as shifting the computing load, isolating the infected device and/or taking the infected device offline.

While one ADS engine 216 is shown in FIG. 2, multiple ADS engines are used in alternate systems, wherein each ADS engine 216 provide a different power-scan inspection result. For example, one ADS engine 216 may look for suspicious operations, another ADS engine 216 may look for known viruses and malware (e.g., one for a rootkit, another for a row hammer attack, etc.) Alternatively, a single ADS engine 216 may include multiple ADS engines, wherein each ADS engine analyzes a different power-based scan. For example, one detection may confirm a variance with a known or normal operation. Another may examine one or more received power-based scans for one or more types of infections, such as those based on a rootkit attack. Another may examine one or more received power-based scans for other types of infection such as one or more row hammer attacks, for example.

Figure 3:
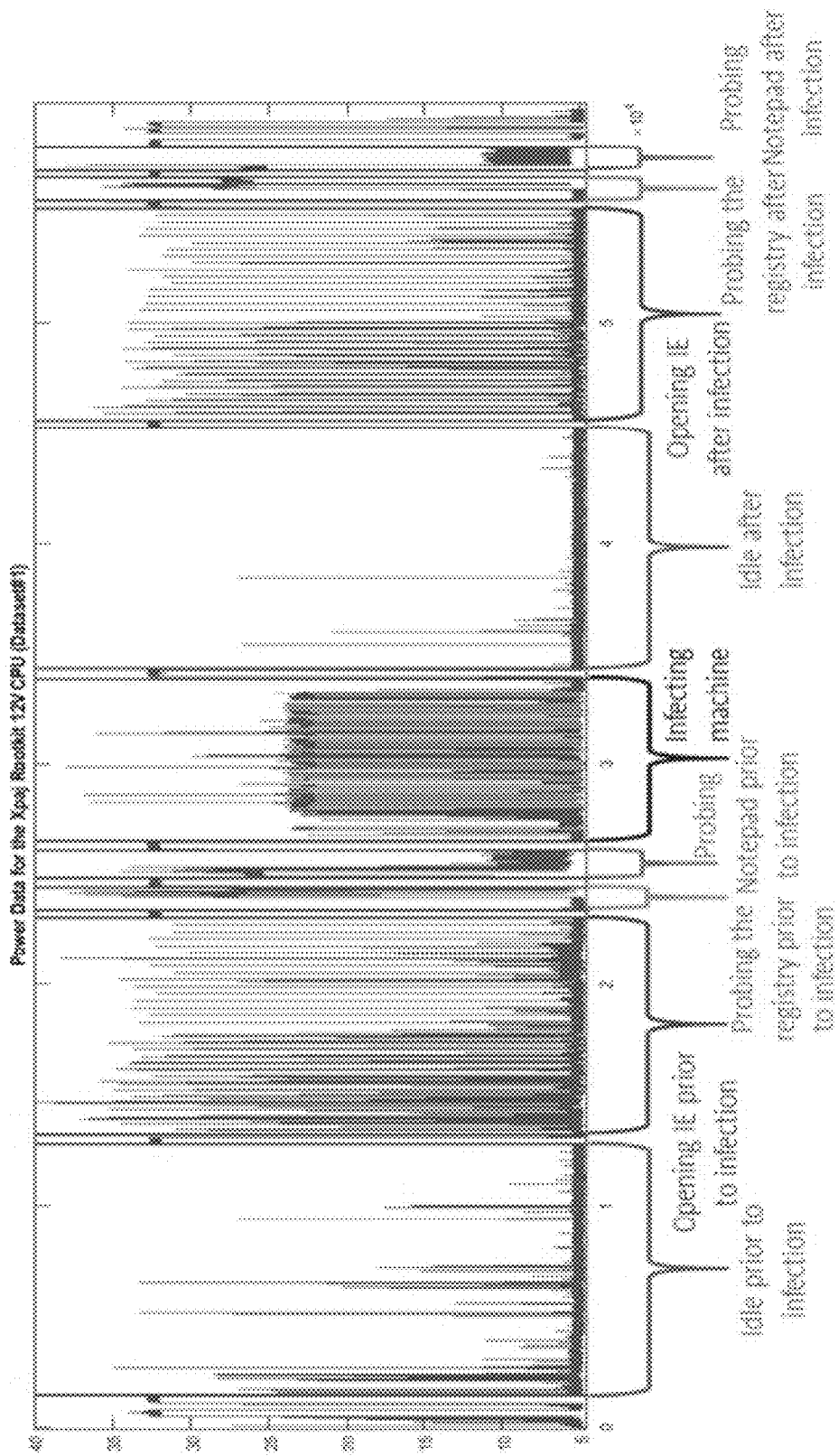
FIG. 3 is shows a group of power consumption profiles.

Another ADS may generate power-based profiles by scanning power consumption associated with operating states and resident programs on a client 214 and/or a web server 210. The operating states and software applications may include idle operating states, opening graphical user interfaces (GUIs) that are used to access HTML files or navigate the Web such as Internet Explorer, for example, scanning device registries, and recording data in virtual notebooks. Through idle operating states and program executions (resident to the client 214 or web server 210), enumerating processes are run via the registry, files are opened and closed, as are network ports, etc. These operations generate distinct power (consumption) profile marks (such as those shown in a twelve volt central processing rail infected with Xpaj in FIG. 3) that are identifiable above a noise floor by the intelligent power sensor 212 monitoring direct current source a monitored device. If a monitored device is in an idle state or a program is operable and power-based profile (e.g., voltage or current profile mark) exceeds a detection threshold and/or varies in frequency, and/or time the virus, malware, or malicious operation is detectable in real-time (e.g., as the virus or malware executes). Because fully automated ADS does not require additional code, it may be deployed on embedded devices and on devices where additional software or modifications to software to accomplish a detection mission is untenable.

An exemplary PSP was generated from ten uninfected power consumption profile segments monitored from a twelve-volt central processing unit rail to generate a baseline for five anomaly detectors 218 shown in FIG. 4. Each detector executed a different statistical measure. One anomaly detector 218 detected power signal shape analysis (e.g., via kurtosis), another anomaly detector 218 detected time series, frequency, and power signal addition analysis while accounting for temporal order (e.g., via permutation entropy), and another anomaly detector 218 identified distinguishing feature analysis (e.g., via data smashing on measured distances of power-based signals). Another anomaly detector 218 analyzed other distinguishing features (e.g., via data smashing on power based shape distances) and another anomaly detector 218 estimated functional error (e.g., via an $L^2$-difference). A semi-supervised anomaly detection technique executed by detection engine 216 established the thresholds associated with the anomaly analysis and respective operating states and software applications of the uninfected power-based profiles. The semi-supervised anomaly detection technique also calculated the threshold(s) that confirm a detection. All of the thresholds were written to the PSP in memory. In FIG. 4, the PSP thresholds associated with a registry scan and a browser task (e.g., an Internet Explorer task) on a single client device is shown below the algorithms executed by the five different anomaly detectors 218. Several different malwares were tested including Alureon, a rootkit, mal-advertising injector and dropper, MaxRootKit, a malware dropper, scareware and botnet application, Pihar, a Trojan, backdoor and malware dropper, Sirefef, a virus that disables security and firewalls that operates as a botnet, and Xpaj, a virus, malware dropper and click-fraud application. In FIG. 4, when four thresholds per row were exceeded, the detection engine 216 detected the malware. As shown in FIG. 4, the ADS detected every instance of the five different types of malware that infected the monitored device from the twelve-volt central processing unit rail.

Figure 5:
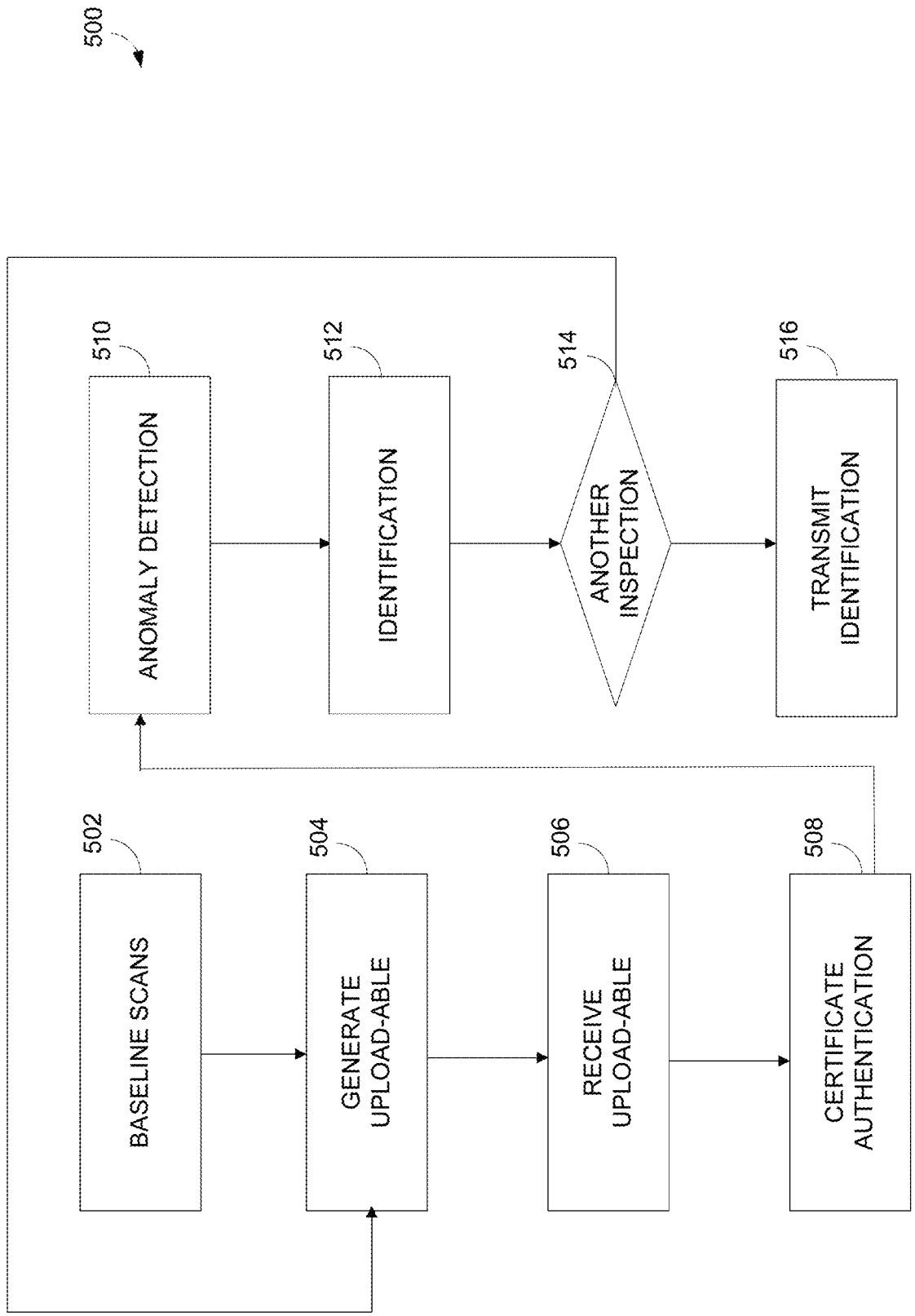
FIG. 5 is a process flow of an automated detection.

FIG. 5 is a process flow 500 of an automated detection. At 502 the ADS detection engine 216 pre-generates or pre-fetches all the power-based scans embodied in the PSP. A PSP preferably includes model(s) and/or statistical thresholds of uninfected baseline direct current power-based operating profiles and/or all direct current power-based profiles generated by all potentially hostile or suspicious computer operations that may be attempted, and may also include the respective arguments for these operations.

After a monitored device executes one or more iterations of the recurrent operation, heartbeat, one or more resident program(s) and/or monitors an operating state, the process attaches an ADS certificate 222 and identifier to one or more upload-able files generated by the intelligent sensor 212 at 504. In some systems, the monitored device assigns a hash of the complete power-based scans associated with the program iterations as part of the identifier. At 506 the ADS receives the file(s). At 508, the certificate authenticator 224 verifies the authenticity of the ADS certificate 222 and hash. At 510, the anomaly detectors 220 process the upload-able file(s).

When a direct current power-profile does not meet a baseline (e.g., because a recurrent voltage level is exceeded, a periodic power profile mark(s) is/are missing, a periodic power profile mark(s) is/are offset in frequency or in time or frequency, etc.,) a monitored device is identified as infected at 512. At 514, the detection engine 216 determines whether another power-based inspection is run. If another is needed, the process repeats. In some processes, the same detection engine 216 and/or anomaly detectors 216 executes all of the inspections; in other processes, other or multiple inspection engines 216 and/or anomaly detectors are used. When the inspection engine 216 determines no more inspections are needed, the ADS engine(s) 216 automatically communicate the identification to a network administrator, load balancer (not shown) and/or web server 210 and/or client device 214 at optional 516. The identification may identify when and where the infection(s) were detected and request remedial action. The remedial action may include shifting computing load, isolating an infected device(s) and/or taking the infected device(s) offline.

Figure 6:
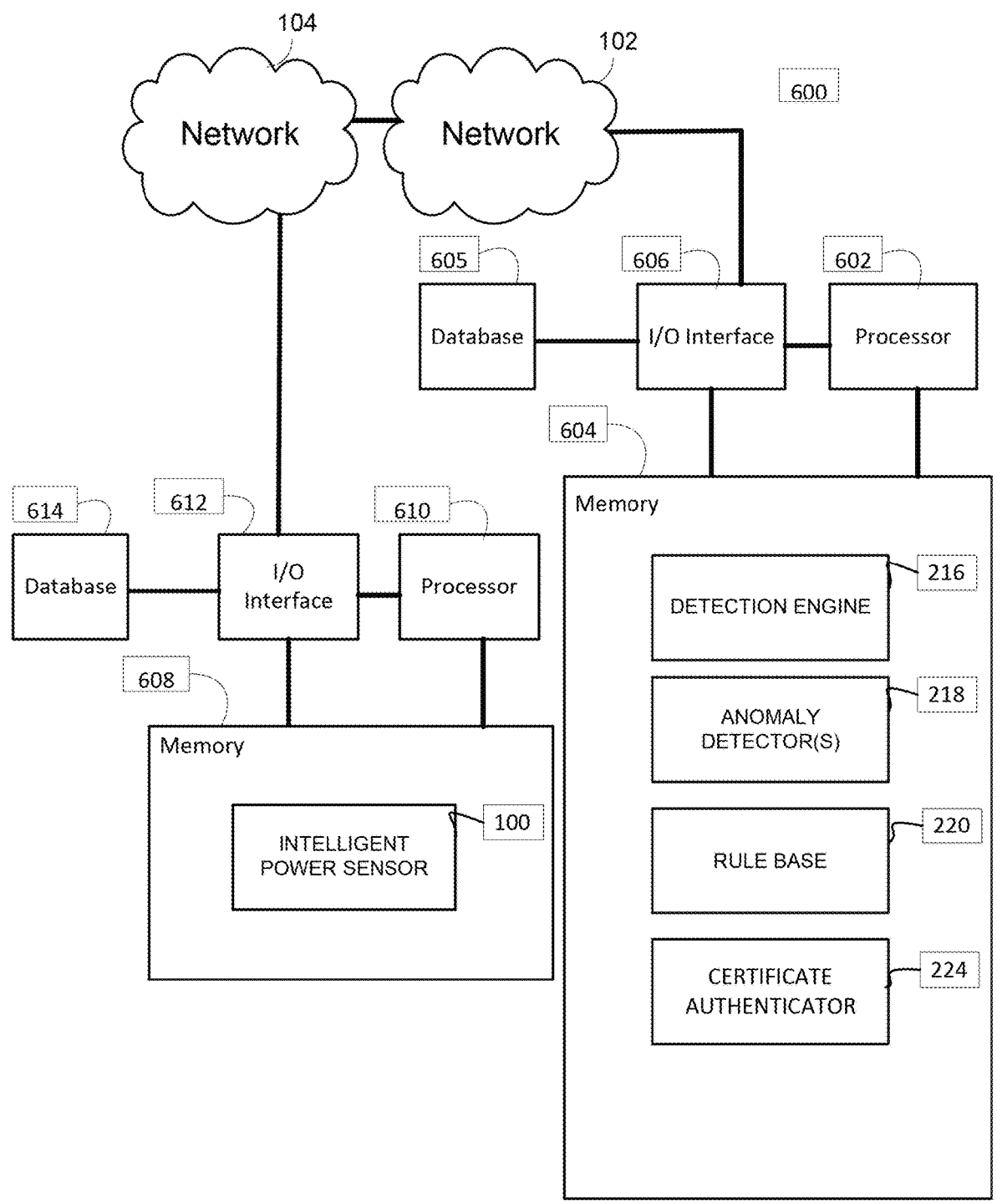
FIG. 6 is an alternate block diagram of an automated detection system and an intelligent power sensor.

FIG. 6 is an alternate block diagram of the ADS and monitored devices 600. The systems comprise a processor 602, a non-transitory media such as a memory 604 (the contents of which are accessible by the processor 602), a database 605, and an I/O interface 606. The I/O interface 606 communicates with local devices (e.g., nodes) and/or remote applications via public and/or private networks 102 and 104, for example, which may include remote clients 214 and servers 210. The memory 604 may store instructions which when executed by the processor 602 causes the system to render some or all of the functionality associated with the ADS. For example, one memory 604 may store instructions which when executed by the processor 602 causes the system to render the functionality associated with the detection engine 216, anomaly detector(s) 218, rule base 220, and certificate authenticator 224. A second memory 608 may store instructions which when executed by a second processor 610 coupled to a second I/O interface 612 and a second a database 614 causes the system to render the functionality associated with the intelligent power sensor 212 that may be remote or unitary to a monitored device.

The processors 602 and 610 may comprise a single processor or multiple processors that may be disposed on a single chip, on multiple devices, or distributed over more than one system. The processors 602 and 610 may be hardware that executes computer executable instructions or computer code embodied in the memory 604 and 608 or in other memory to perform one or more features of the systems described herein. The processors 602 and 610 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 604 and 608 and/or storage disclosed may retain an ordered listing of executable instructions for implementing the functions described above. The machine-readable medium may selectively be, but not limited to, an electronic, a magnetic, an optical, an electromagnetic, an infrared, non-transient medium, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), an Oblivious Random Access Memory (ORAM), or a database management system. The memory 604 may comprise a single device or multiple devices that may be disposed on one or more dedicated memory devices or on a processor or other similar device. The memory 604 and 608 may also store a non-transitory computer code, executable by processor 602 and 610. The computer code may be written in any computer language, such as C, C++, assembly language, ladder logic, and/or any combination of computer languages.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the logic or instructions are stored in a remote location for transfer through a computer network or over wireless or tangible telephone or communication lines.

The term "coupled" disclosed in this description may encompass both direct and indirect coupling. Thus, first and second circuits are said to be coupled together when they directly communicate with one another, as well as when the first circuit communicates with an intermediate circuit which couples either directly or via one or more additional intermediate circuits communicate to the second circuit. The term "substantially" or "about" may encompass a range that is largely, but not necessarily wholly, that which is specified. It encompasses all but a significant amount, such as a variance within five or ten percent. When devices are responsive to commands events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely follow another action.

The ADS detects malware and/or viruses intended to damage or disable a network and/or an electronic device. Automated detection occurs upon an event such as when a program launches or on a schedule (e.g., at specific times and/or days). The system's near real-time analysis (e.g., updating information as the same rate it is received) provides continuous feedback and pinpoint identifications that establish when and where infections occurred. The system provides fewer false positive detections than known systems and is capable of identifying temporal trends.

The power-profile approach enables a more flexible and nuanced virus detection. After the ADS generates a clean operating power security profile, the ADS can pinpoint and communicate when and where an infection occurred, which allows the infected device to determine whether to shut down the infected code, the hosting application, or even the infected device by reviewing a security policy that is associated with the infected device or the user. Different security policies may be tailored to different users, types of users, devices, and/or types of devices. Further, access to the security profile including information about particular known and unknown potential threats enables information technology administrators to construct security policies with highly granular rules for one or more machined and allows the administrator to alter those security policies in response to evolving threats. The detection of known and unknown threats without burdening a targeted or infected device makes the ADS not abstract and substantially more.

The automated ADS also provides new virus and malware protections. The systems and methods eliminate the need for manual inspections and speeds up malware identification as it detects malware on networks, servers, and end-user devices. By identifying both variant and invariant forms of malware through a turnkey system and process, the ADS respond quickly and efficiently to known and unknown variant and invariant malware and viruses.

While various embodiments of the invention have been described, it will be apparent to those of ordinary skill in the art that many more embodiments and implementations are possible within the scope of the inventions. Accordingly, the inventions are not to be restricted except in light of the attached claims and their equivalents.

What is claimed is:

1. A method comprising:
generating a non-malicious fully automated recurrent code that executes a fully automated recurrent software operation on a monitored device that operates on a periodic operating schedule and consumes a power level below a noise floor of the monitored device;
generating a direct current source power consumption profile by causing the monitored device to execute a fully automated recurrent software operation;
receiving by an automated detection system the direct current source power consumption profile generated by an intelligent power sensor;
generating by a detection engine a power security profile that identifies a suspicious code by profiling a direct current consumed by monitored type devices; and
executing by a detection engine remote from the monitored device an identification of an infected device;
where the non-malicious fully automated recurrent code is generated remote from the monitored device; and
where the suspicious code is identified when the direct current consumed is below a threshold because a power profile associated with the non-malicious fully automated recurrent code is not generated.

2. The method of claim 1 wherein the recurrent software operation occurs at regular time or frequency intervals during the time in which a monitored device is actuated.

3. The method of claim 1 wherein the detection of the infected device occurs when a power profile mark below a noise floor is not detected.

4. The method of claim 3 wherein the detection of the infected device occurs when the power profile mark exceeds a threshold.

5. The method of claim 1 wherein the detection of the infected device occurs when a power profile mark exceeds a threshold.

6. The method of claim 1 wherein the recurrent software operation comprises executing only a plurality of kernel application program interface (API) calls.

7. The method of claim 1 wherein the power security profile is generated by an unsupervised anomaly detection.

8. The method of claim 7 wherein the power security profile is generated by a plurality of supervised anomaly detections.

9. The method of claim 1 wherein the identification is based on a detected power signal shape.

10. The method of claim 1 wherein the identification is based on measured distances of power-based signals.

11. The method of claim 1 wherein the identification is based on a measured shape distances of power-based signals.

12. The method of claim 1 wherein the direct current source power consumption profile generated by the intelligent power sensor reflects power consumption that occurs during a processors idle operating states.

13. The method of claim 1 wherein the direct current source power consumption profile generated by the intelligent power sensor reflects power consumption that occurs when scanning a registry of the monitored device.

14. A non-transitory machine-readable medium encoded with machine-executable instructions, wherein execution of the machine-executable instructions is for:
generating a non-malicious fully automated recurrent code that executes a fully automated recurrent software operation on a monitored device that operates on a periodic operating schedule and consumes a power level below a noise floor of the monitored device;
generating a direct current source power consumption profile by causing the monitored device to execute a fully automated recurrent software operation;
receiving by an automated detection system the direct current source power consumption profile generated by an intelligent power sensor;
generating by a detection engine a power security profile that identifies suspicious code by profiling direct current consumed by monitored type devices; and
executing by a detection engine remote from the monitored device an identification of an infected device
where the non-malicious fully automated recurrent code is generated remote from the monitored device; and
where the suspicious code is identified when the direct current consumed is below a threshold due because a power profile associated with the non-malicious fully automated recurrent code is missing.

15. The non-transitory machine-readable medium of claim 14 wherein the recurrent software operation occurs at regular time period or at frequency intervals in which the monitored device is actuated.

16. The non-transitory machine-readable medium of claim 14 wherein the detection of the infected device occurs when a power profile mark below a noise floor is not detected.

17. The non-transitory machine-readable medium of claim 16 wherein the detection of the infected device occurs when the power profile mark exceeds a threshold.

18. The non-transitory machine-readable medium of claim 14 wherein the detection of the infected device occurs when a power profile mark exceeds a threshold.

19. The non-transitory machine-readable medium of claim 16 wherein the recurrent software operation comprises executing only a plurality of kernel application program interface (API) calls.

20. The non-transitory machine-readable medium of claim 16 wherein the power security profile is generated by an unsupervised anomaly detection.

21. The non-transitory machine-readable medium of claim 20 wherein the power security profile is generated by a plurality of supervised anomaly detections.

22. The non-transitory machine-readable medium of claim 16 wherein the identification is based on a detected power signal shape.

23. The non-transitory machine-readable medium of claim 14 wherein the identification is based on measured distances of power-based signals.

24. The non-transitory machine-readable medium of claim 14 wherein the identification is based on measured shape distances of power-based signals.

25. The non-transitory machine-readable medium of claim 16 wherein the direct current source power consumption profile generated by the intelligent power sensor reflects power consumption that occurs during a processors idle operating states.

26. The non-transitory machine-readable medium of claim 16 wherein the direct current source power consumption profile generated by the intelligent power sensor reflects power consumption that occurs when scanning a registry of the monitored device.

27. A system comprising:
a remote device that generates a non-malicious fully automated recurrent code that executes a fully automated recurrent software operation on a monitored device that operates on a periodic operating schedule and consumes a power level below a noise floor of the monitored device;

a monitored device that executes a fully automated recurrent software operation;

an intelligent power sensor that generates direct current source power consumption profiles from a monitored device;

a detection engine that generates a power security profile that identifies suspicious code by profiling a direct current consumed by monitored type devices;

where the non-malicious fully automated recurrent code is generated remote from the monitored device; and where the suspicious code is identified when the direct current consumed is below a threshold because a power profile associated with the non-malicious fully automated recurrent code is not generated; and where the detection engine remote from the monitored device an identifies infected devices by processing the direct current source power consumption profiles with the power security profiles.

28. A system comprising:

means for generating a non-malicious fully automated recurrent code that executes a fully automated recurrent software operation on a monitored device that operates on a periodic operating schedule and consumes power below a noise floor;

means for generating a direct current source power consumption profile by causing monitored device to execute the fully automated recurrent software operation;

means for receiving by an automated detection system the direct current source power consumption profile generated by an intelligent power sensor;

means for generating by a detection engine a power security profile that identifies suspicious code by profiling a direct current consumed by monitored type devices; and means for executing by a detection engine remote from the monitored device an identification of an infected device; p1 where the non-malicious fully automated recurrent code is generated remote from the monitored device; and where the suspicious code is identified when the direct current consumed is below a threshold because a power profile associated with the non-malicious fully automated recurrent code is missing.

* * * * *